(12) United States Patent
Myers, Jr. et al.

(10) Patent No.: US 10,846,369 B2
(45) Date of Patent: Nov. 24, 2020

(54) SYSTEM AND METHOD FOR VISUAL ANALYSIS OF HEALTHCARE CLAIMS

(71) Applicant: Medworth, LLC, Mobile, AL (US)

(72) Inventors: Thomas Cookson Myers, Jr., Mobile, AL (US); Brook Allen Ettestad, Mobile, AL (US); Christopher Kindred Townsend, Demopolis, AL (US)

(73) Assignee: Medworth, LLC, Mobile, AL (US)

( * ) Notice: Subject to any disclaimer, the term of this patent is extended or adjusted under 35 U.S.C. 154(b) by 1323 days.

(21) Appl. No.: 14/988,539

(22) Filed: Jan. 5, 2016

(65) Prior Publication Data

US 2016/0140304 A1  May 19, 2016

Related U.S. Application Data

(63) Continuation of application No. 13/481,585, filed on May 25, 2012, now abandoned.

(51) Int. Cl.
*G06F 19/00* (2018.01)
*G06F 3/0484* (2013.01)
(Continued)

(52) U.S. Cl.
CPC ......... *G06F 19/328* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS 4,616,854 A * 10/1986 Landrum ........... B42D 15/0033
283/54
7,606,721 B1   10/2009 Donnelly et al.
(Continued)

OTHER PUBLICATIONS

InetSoft, Business Intelligence for Insurance, Mar. 7, 2012, pp. 1-2, <https://web.archive.org/web/20120307021152/https://www.inetsoft.com/solutions/industry/insurance/> (Year: 2012).*

*Primary Examiner* — Fonya M Long
*Assistant Examiner* — William G Lultschik
(74) *Attorney, Agent, or Firm* — Neal, Gerber & Eisenberg LLP; Thomas E. Williams; Nawshaba Siddiquee

(57) ABSTRACT

Methods and systems are provided for dynamically presenting visually codified information associated with healthcare claims for payment of medical services and/or products provided to respective patients. Received healthcare claim information is stored in a healthcare claim database, and a healthcare claim graphic is created for each healthcare claim according to pre-determined specifications and using the healthcare claim information. Each healthcare claim graphic includes data fields for displaying different categories of information, a color scheme for representing information included in each of a first group of data fields, and one or more symbols for representing information included in each of a second group of data fields. A collection of healthcare claim graphics is displayed with a plurality of zoom options for dynamically toggling between a summary view of the entire collection, a semi-detailed view of a group of graphics, and a detailed view of one graphic.

19 Claims, 8 Drawing Sheets
(6 of 8 Drawing Sheet(s) Filed in Color)

(51) Int. Cl.
　　　*G06Q 10/10*　　　(2012.01)
　　　*G06Q 50/22*　　　(2018.01)
　　　*G06F 3/0482*　　(2013.01)

(52) U.S. Cl.
　　　CPC ............. *G06Q 10/10* (2013.01); *G06Q 50/22* (2013.01); *G06F 2203/04806* (2013.01)

(56) References Cited

U.S. PATENT DOCUMENTS

| | | |
|---|---|---|
| 2003/0195771 A1 | 10/2003 | Fitzgerald et al. |
| 2009/0287509 A1 | 11/2009 | Basak et al. |
| 2010/0138243 A1 | 6/2010 | Carroll |
| 2011/0066445 A1 | 3/2011 | Klain et al. |
| 2011/0153360 A1 | 6/2011 | Hanina et al. |
| 2012/0096384 A1 | 4/2012 | Albert et al. |
| 2012/0240072 A1 | 9/2012 | Altamura et al. |
| 2013/0212432 A1* | 8/2013 | Guthrie ............... G06F 11/0709 714/16 |

\* cited by examiner

SYSTEM AND METHOD FOR VISUAL ANALYSIS OF HEALTHCARE CLAIMS

TECHNICAL FIELD

This invention generally relates to management of insurance claims for healthcare services, and more particularly relates to a system and method for visual analysis of a large collection of healthcare claims based on one or more informational aspects of the claims.

BACKGROUND OF THE INVENTION

The complexity and sheer size of the healthcare industry has created large administrative systems that coordinate the provision of, and payment for, healthcare services between providers, administrators, patients, and payers. These administrative systems may create, collect, and adjudicate payment requests, or healthcare claims, made by the provider. A payment request, or healthcare claim, typically includes bills for costs associated with the provision of healthcare services and/or products to patients. Processing these payment requests is a massive undertaking. Healthcare providers may process hundreds to thousands of payment requests each day and thousands to millions of requests annually.

In a typical scenario, when an insured patient receives medical services and/or products from a healthcare service provider (i.e., provider), the provider, or an associated administrator, submits a healthcare claim to the patient's healthcare insurance company (i.e., payer). To generate the healthcare claim, the provider may enter claim-related data into a computer using software programs specifically designed for healthcare claim submissions. For example, the healthcare claim data may include date of service, patient identification number, various codes pertaining to the type of examination(s) and/or procedure(s) performed, any supplies used therewith, and the diagnosis made, and, of course, the costs associated with each service or product rendered. The healthcare claim data is then transmitted to one or more patient payers. Upon receiving a healthcare claim, the patient payer processes the healthcare claim to determine whether, and how much, to pay on the claim. The amount of payment authorized for each claim may vary based on the service or procedure performed and whether it is consistent with current medical practice. The amount of payment may also be determined by the particular contractual agreement between the payer and the provider or the contractual agreements between the payer and the patient regarding allocation of payment for treatments.

The patient payer may decide to dispute (e.g., reject or deny, request resubmission) a submitted claim for a number of reasons. For one, the provider may have failed to meet formatting and/or content requirements set by the patient payor to help automate its claim submission process. For example, the patient payer may require specific information depending on the particular provider (e.g., a hospital, a clinical facility, a private physician, etc.) and/or the type of services rendered. Claims may also be disputed if there is a concern regarding the accuracy and/or validity of the included charges. For example, honest mistakes and misunderstandings about the proper formulation of a healthcare claim can result in unwarranted, inflated charges. Also, dishonest practices may have been discovered, such as, for example, duplicate billing for the same service, overbilling for the number of units provided, and testing in excess of what is considered medically necessary for the given case. In the end, the patient payer may deny payment on a disputed claim or require the provider to resubmit an adjusted and/or corrected claim. Once all disputes are cleared, the patient payer may reimburse the provider for all or part of the included charges.

SUMMARY OF THE INVENTION

The invention is defined by the appended claims. This description summarizes some aspects of the present embodiments and should not be used to limit the claims. A technical advance is achieved by a system and method consistent with the invention, which visually codifies informational aspects of each healthcare claim in a large collection of healthcare claims, so as to enable a user to visually analyze each claim, or the collection of claims as a whole, depending on a selected display option.

One embodiment is directed to a system for dynamically presenting visually codified information associated with a plurality of healthcare claims submitted by healthcare service providers for payment of medical services and/or products provided to respective patients. The system comprises a database stored in a memory and a processor in communication with said database. The database is configured to store claim information associated with the plurality of healthcare claims, and the claim information is categorized into a plurality of categories, including a claim status, claim type, patient type, and payer type. The processor being configured to execute program code for receiving, from the database, the claim information associated with each of the plurality of healthcare claims, and determining a set of specifications for each healthcare claim based on the claim status of the healthcare claim. The program code is further for creating a graphic for each healthcare claim according to the set of specifications and using the claim information associated with the healthcare claim. Each graphic includes a plurality of data fields for displaying the claim information associated with the healthcare claim for which the graphic is created, and the plurality of data fields includes a first group of data fields and a second group of data fields different from the first group of data fields. Further, each data field contains a piece of the claim information belonging to a respective one of the plurality of categories. The program code is also for, for each graphic, assigning a color to each data field in the first group of data fields based on a value of the piece of claim information included in the data field, and for each graphic, assigning a symbol to each data field in the second group of data fields based on the piece of claim information included in the data field, wherein the symbol is configured to be displayed in the graphic in place of the piece of claim information. In addition, the program code is for providing, on a display, a plurality of user-selectable zoom options for dynamically toggling between a summary view of a collection of graphics, a group view of a user-selected group of graphics, and a detailed view of a user-selected graphic. The program code is additionally for, upon receiving user-selection of the zoom option for the summary view, automatically resizing the collection of graphics to fit within a display area of the display and for each graphic, displaying only the colors assigned to the first group of data fields; upon receiving user-selection of the zoom option for the group view, automatically resizing the user-selected group of graphics to fit within the display area and for each graphic, displaying only the colors assigned to the first group of data fields and the symbols assigned to the second group of data fields; and upon receiving user-selection of the zoom option for the detailed view, automatically resizing the user-selected graphic to fit within the display area and displaying all of the plurality of data fields for the graphic, in addition to the colors assigned to the first group of data fields and the symbols assigned to the second group of data fields. In addition, for each healthcare claim, the set of specifications determines a selection of the plurality of data fields to be displayed in each view and an arrangement of said plurality of data fields within the associated graphic.

Other systems, methods, features, and advantages of the invention will be, or will become, apparent to one having ordinary skill in the art upon examination of the following drawings and detailed description. It is intended that all such additional articles of manufacture, features, and advantages included within this description, be within the scope of the invention, and be protected by the accompanying claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention can be better understood with reference to the following drawings. The components in the drawings are not necessarily to scale, emphasis instead being placed upon clearly illustrating the principles of the invention. In the drawings, like reference numerals designate corresponding parts throughout the several views.

Figure 1:
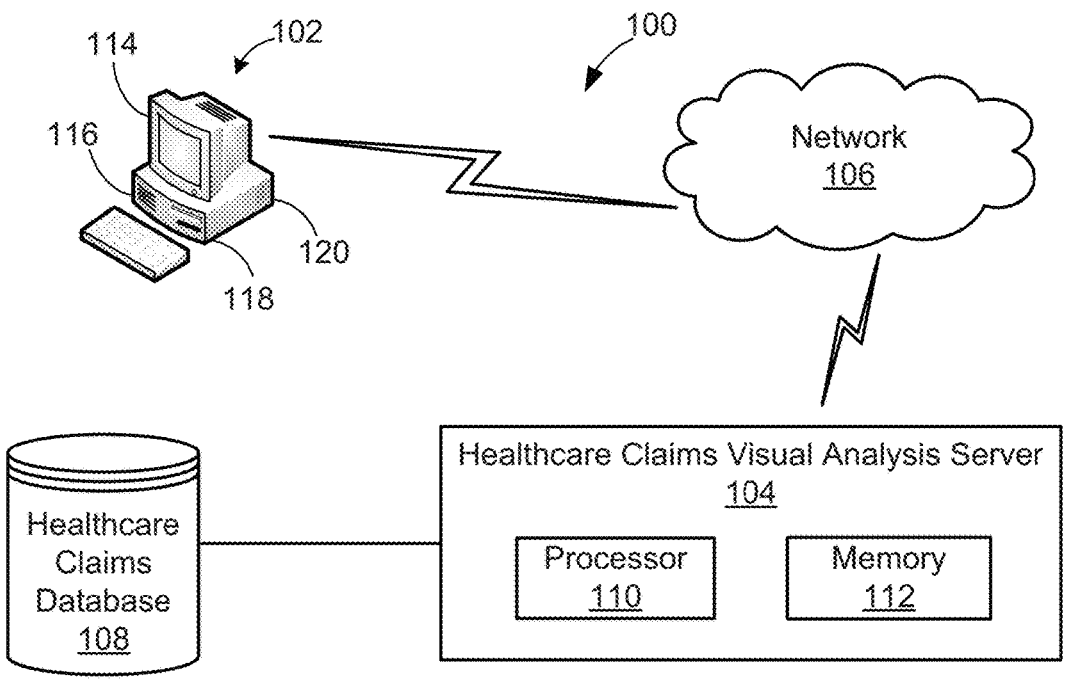
FIG. 1 is a block diagram illustrating a networked computing system in accordance with an embodiment of the invention.

Illustrative and exemplary embodiments of the invention are described in further detail below with reference to and in conjunction with the figures.

DETAILED DESCRIPTION OF THE DRAWINGS

The invention is defined by the appended claims. This description summarizes some aspects of the present embodiments and should not be used to limit the claims. While the invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Now referring to FIG. 1, a networked system 100, for visually codifying a plurality of healthcare claims submitted by healthcare service providers for payment of medical services and/or products provided to respective patients, is shown in accordance with a particular embodiment of the invention. In the exemplary embodiment of FIG. 1, the networked system 100 comprises a user computer 102 communicatively connected to a healthcare claims visual analysis server 104 (hereinafter referred to as "server") through a network 106 (e.g. the Internet, an intranet network, a local area network (LAN), a global network, or a wide area network (WAN)). The server 104 is communicatively connected to a healthcare claims database 108 for storing healthcare claims information. The healthcare claims database 108 may be wirelessly accessed by the server 104 over a network connection (e.g., an intranet network, a local area network (LAN), a global network, a wide area network (WAN), or the Internet). Alternatively, the healthcare claims database 108 may be operatively connected to the server 104 via a cable. In one embodiment, the server 104 includes the healthcare claims database 108. The server 104 may include a processor 110 and a memory 112, and preferably includes a plurality of programs stored within the memory 112 and executed by the processor 110. For example, the programs may include programs for receiving and processing queries electronically transmitted from the user computer 102. In the depicted embodiment, the user computer 102 includes a computer monitor 114, a desktop processing unit 116, a memory unit 118, and a web browsing software application 120. Though the user computer 102 is shown as a personal computer in FIG. 1, the user computer 102 may alternatively be a handheld or a portable computing device.

In certain embodiments, the electronic transmission between the server 104 and user computer 102 may occur through File Transfer Protocol ("FTP"), Internet Transfer Protocol ("TCP/IP") or others. For security reasons, the electronic transmission may occur via dedicated and/or secure communication lines that provide secured file transfers, such as through Secure File Transfer Protocol ("SFTP") with encryption tools. In one embodiment, the server 104 may be associated with one or more healthcare service providers (e.g., hospitals, administrators, medical professionals, including: physicians, clinicians, nurses, etc.) to analyze healthcare claims submitted to various medical insurance companies for payment of medical services and/or products provided to respective patients. In another embodiment, the server 104 may be associated with a third-party business involved in managing healthcare claims on behalf of a healthcare service provider (i.e. provider).

In a typical scenario, when a provider provides healthcare services to a patient, payment for the services provided may be paid in full by the patient him/herself or the patient may provide insurance information for the medical insurer (i.e. payer) to pay all or part of the service charges. In the latter case, the provider files a claim with the patient's payer to obtain the balance of charges. The claim may categorize information about the different aspects of the claim into one or more claim aspect categories, including, for example, personal information about the patient (e.g., name, address, birthdate, social security number), medical information (e.g., services and procedure(s) performed, tests taken, diagnosis made, and charges and dates for each service/procedure/test), and insurance information (e.g., name(s) of payer (s), type of payer(s), and payer account number(s)). Other claim aspect categories may include, for example, general claim information (e.g., facility name, department name, billing date, and payment due date). The provider may submit the claim electronically through, for example, the Internet, in the form of a data message, such as an electronic interchange (EDI) message, to the payer. The EDI message may be a health insurance portability and accountability act (HIPAA) EDI healthcare claim transaction message, also known and referred to as EDI message 837. The payer then acknowledges receipt of the submitted claim with a reply EDI message, such as EDI Functional Acknowledgement Transaction set or message 997. Subsequently, after adjudicating the provider's claim, the payer can send another EDI message, such as EDI Healthcare Claim Payment/Advice Transaction message 835 (also known and referred to as EDI message 835), advising the provider as to the amount being paid for the claim and the date on which the payment(s) will be issued.

Depending on the information received (or not received) from the payer in, for example, the EDI message 835, the provider may classify each healthcare claim, for example, into one of four claim status categories: remitted (i.e. paid), unremitted (i.e. unpaid), denied (i.e. rejected), or adjusted. A healthcare claim may be considered "paid" as of a certain date if the claim has received at least one remittance prior to said date, and if the net of all such remittances is positive. A healthcare claim may be considered "unremitted" as of a certain date if no remittances (or payments) have been received from the payer prior to said date. For example, the provider may be waiting for the payer to send an EDI message 835 for that claim, or otherwise finish processing the claim and make a payment. A healthcare claim may be considered "adjusted" as of a certain date if, for example, a received EDI message 835 advises that the payer has decided to pay less than the requested reimbursement. The EDI message 835 may include a reason code for the adjustment, such as, for example, adherence to healthcare industry standards for the included charges and/or adherence to a healthcare coverage agreement between the patient and the payer. A healthcare claim may be considered "denied" as of a certain date if, for example, a EDI message 835 indicating denial has been received and the net of all remittances for the claim is zero or negative. The EDI message 835 may include a reason code for denial of the claim, such as, for example, providing services in excess of what is considered medically necessary, duplicating charges, and/or submitting an incomplete claim.

According to the embodiment depicted in FIG. 1, the provider maintains a healthcare claim database 108 that stores healthcare claim information associated with each healthcare claim. For example, the database 108 may store the EDI message 835 and the EDI message 837 associated with each healthcare claim. Database 108 may be constantly updated as EDI messages are transmitted and received, to ensure that the database information stays current. The database 108 may be included on a database server, or any other type of computer or server configured to provide database services in a networked environment. Exemplary database servers that may be used in accordance with this embodiment, include, but are not limited to, an Oracle server, an IBM DB2 server, an IBM Informix server, and an SQL server. In one embodiment, the database 108 may be included on the healthcare claims visual analysis server 104, and the server 104 may configured to provide database server functionality.

In one embodiment, the healthcare claims visual analysis server 104 is configured as a dynamic, front-end web server for accepting requests (e.g., an HTTP get request) from the user computer 102 via the network 106 and for dynamically generating web content (e.g., XML content) to be sent back to the user computer 102 in accordance with the received request. According to this embodiment, the database 108 is configured as a back-end storage device that supports the server 104 by providing the data necessary to generate the requested web content. The server 104 may include one or more computer programs for dynamically generating web content in accordance with this embodiment. Similarly, the user computer 102 may include one or more computer programs, in addition to, and/or included within, the web browsing software application 120, for interacting with the dynamic web content generated and sent by the server 104. In one embodiment, commercially available computer programs may be used to impart at least part of the functionality described herein, such as, for example, HTML 5, Adobe Flash, Adobe Photoshop, Microsoft Silverlight, and/or Microsoft Silverlight Pivotviewer.

Figure 2:
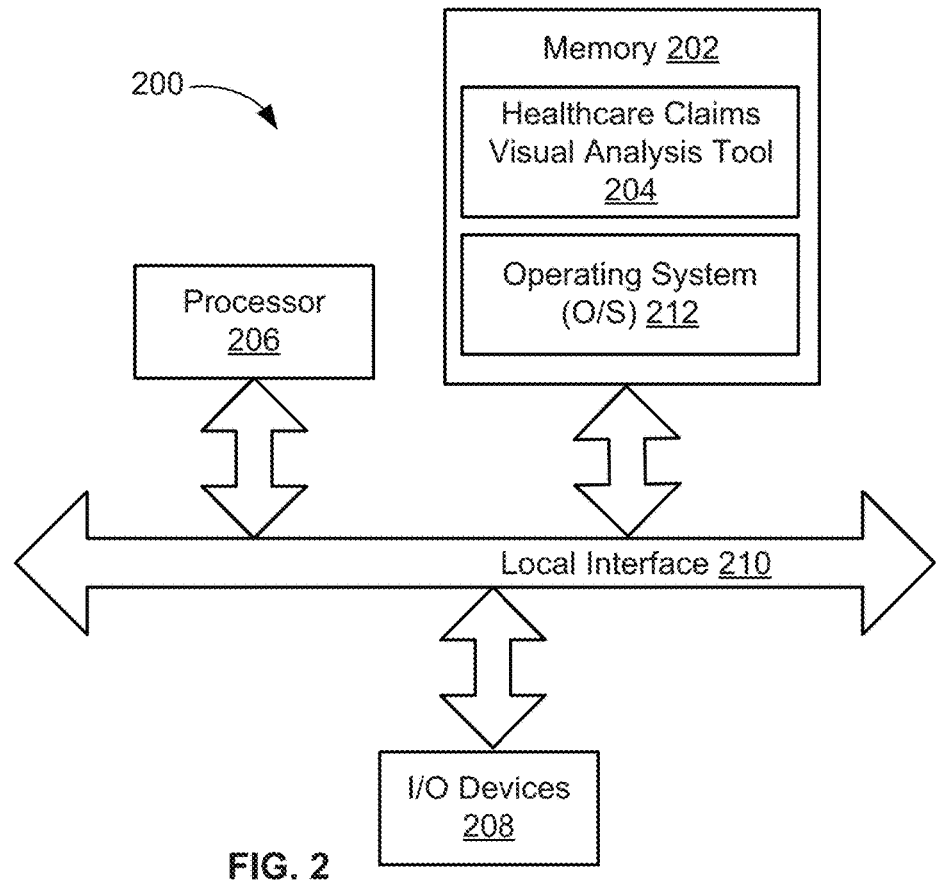
FIG. 2 is a block diagram illustrating one form of a computer or server of FIG. 1.

FIG. 2 illustrates a block diagram of a computer 200. The computer 200 may be any one of the user computer 102 or the server 104 of FIG. 1, or any computer associated with the networked system 100. Without loss of generality and as an exemplary computer, the server 104 is discussed hereafter. The computer 200 may include a memory element 202. The memory element 202 may include a computer readable medium for implementing a healthcare claims visual analysis tool 204 for visually codifying informational aspects of a large collection of healthcare claims so that the information conveyed about each healthcare claim varies in terms of scope and preciseness based on a selected display option.

The healthcare claims visual analysis tool 204 may be implemented in software, firmware, hardware, or any combination thereof. For example, in one mode, the healthcare claims visual analysis tool 204 is implemented in software, as an executable program, and is executed by one or more special or general purpose digital computer(s), such as a personal computer (PC; IBM-compatible, Apple-compatible, or otherwise), personal digital assistant, workstation, minicomputer, mainframe computer, computer network, "virtual network" or "internet cloud computing facility." Therefore, computer 200 may be representative of any computer in which the healthcare claims visual analysis tool 204 resides or partially resides.

Generally, in terms of hardware architecture, as shown in FIG. 2, the computer 200 includes a processor 206, memory 202, and one or more input and/or output (I/O) devices 208 (or peripherals) that are communicatively coupled via a local interface 210. The local interface 210 may be, for example, but is not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface may include address, control, and/or data connections to enable appropriate communications among the other computer components.

Processor 206 is a hardware device for executing software, particularly software stored in memory 202. Processor 206 can be any custom made or commercially available processor, a central processing unit (CPU), an auxiliary processor among several processors associated with the computer 200, a semiconductor based microprocessor (in the form of a microchip or chip set), another type of microprocessor, or generally any device for executing software instructions. Processor 208 may also represent a distributed processing architecture such as, but not limited to, SQL, Smalltalk, APL, KLisp, Snobol, Developer 200, and MUMPS/Magic.

Memory 202 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 202 may incorporate electronic, magnetic, optical, and/or other types of storage media. Memory 202 can have a distributed architecture where various components are situated remote from one another, but are still accessed by processor 206.

The software in memory 202 may include one or more separate programs. The separate programs comprise ordered listings of executable instructions for implementing logical functions. In the example of FIG. 2, the software in memory 202 includes the healthcare claims visual analysis tool 204 in accordance with the present invention and a suitable operating system (O/S) 212. A non-exhaustive list of examples of suitable commercially available operating systems 212 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in hand-held computers or personal digital assistants (PDAs) (e.g., PalmOS available from Hewlett-Packard Company, Windows CE, and Mobile 7 available from Microsoft Corporation, Symbian from Nokia, Android from Google, Inc, and Apple iOS for iPhones, iPod Touch, and iPads from Apple, Inc). Operating system 212 essentially controls the execution of other computer programs, such as the healthcare claims visual analysis tool 204, and provides scheduling, input-output control, file and data management, memory management, and communication control and related services.

The healthcare claims visual analysis tool 204 may be a source program, executable program (object code), script, or any other entity comprising a set of instructions to be performed. When a "source" program, the program needs to be translated via a compiler, assembler, interpreter, or the like, which may or may not be included within the memory 202, so as to operate properly in connection with the O/S 212. Furthermore, the healthcare claims visual analysis tool 204 can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, .Net, HTML, and Ada. In one embodiment, the healthcare claims visual analysis tool 204 is written in T-SQL. Functional programming languages, such as Haskell and Erlang, can also be used to implement embodiments of the present invention.

The I/O devices 208 may include input devices, for example but not limited to, input modules for PLCs, a keyboard, mouse, scanner, microphone, touch screens, bar code readers, stylus, laser readers, radio-frequency device readers, etc. Furthermore, the I/O devices 208 may also include output devices, for example but not limited to, output modules for PLCs, a printer, bar code printers, displays, etc. Finally, the I/O devices 208 may further comprise devices that communicate with both inputs and outputs, including, but not limited to, a modulator/demodulator (modem; for accessing another device, system, or network), a radio frequency (RF) or other transceiver, a telephonic interface, a bridge, and a router.

If the computer 200 is a PC, workstation, PDA, or the like, the software in the memory 202 may further include a basic input output system (BIOS) (not shown in FIG. 2). The BIOS is a set of essential software routines that initialize and test hardware at startup, start the O/S 212, and support the transfer of data among the hardware devices. The BIOS is stored in ROM so that the BIOS can be executed when computer 200 is activated.

When computer 200 is in operation, processor 204 is configured to execute software stored within memory 202, to communicate data to and from memory 202, and to generally control operations of computer 200 pursuant to the software. The healthcare claims visual analysis tool 204, and the O/S 212, in whole or in part, but typically the latter, may be read by processor 206, buffered within the processor 206, and then executed.

When the healthcare claims visual analysis tool 204 is implemented in software, as is shown in FIG. 2, it should be noted that the healthcare claims visual analysis tool 204 can be stored on any computer readable medium for use by or in connection with any computer related system or method. In one embodiment, the healthcare claims visual analysis tool 204 is implemented in a centralized application service provider arrangement. In the context of this document, a "computer-readable medium" may be any means that can store, communicate, propagate, or transport data objects for use by or in connection with the healthcare claims visual analysis tool 204. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The healthcare claims visual analysis tool 204 can be embodied in any type of computer-readable medium for use by or in connection with an instruction execution system or apparatus, such as a computer.

In another embodiment, where the healthcare claims visual analysis tool 204 is implemented in hardware, the healthcare claims visual analysis tool 204 may also be implemented with any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For purposes of connecting to other computing devices, computer 200 is equipped with network communication equipment and circuitry. In a preferred embodiment, the network communication equipment includes a network card such as an Ethernet card, or a wireless connection card. In a preferred network environment, each of computer 200 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computer 200 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 3:
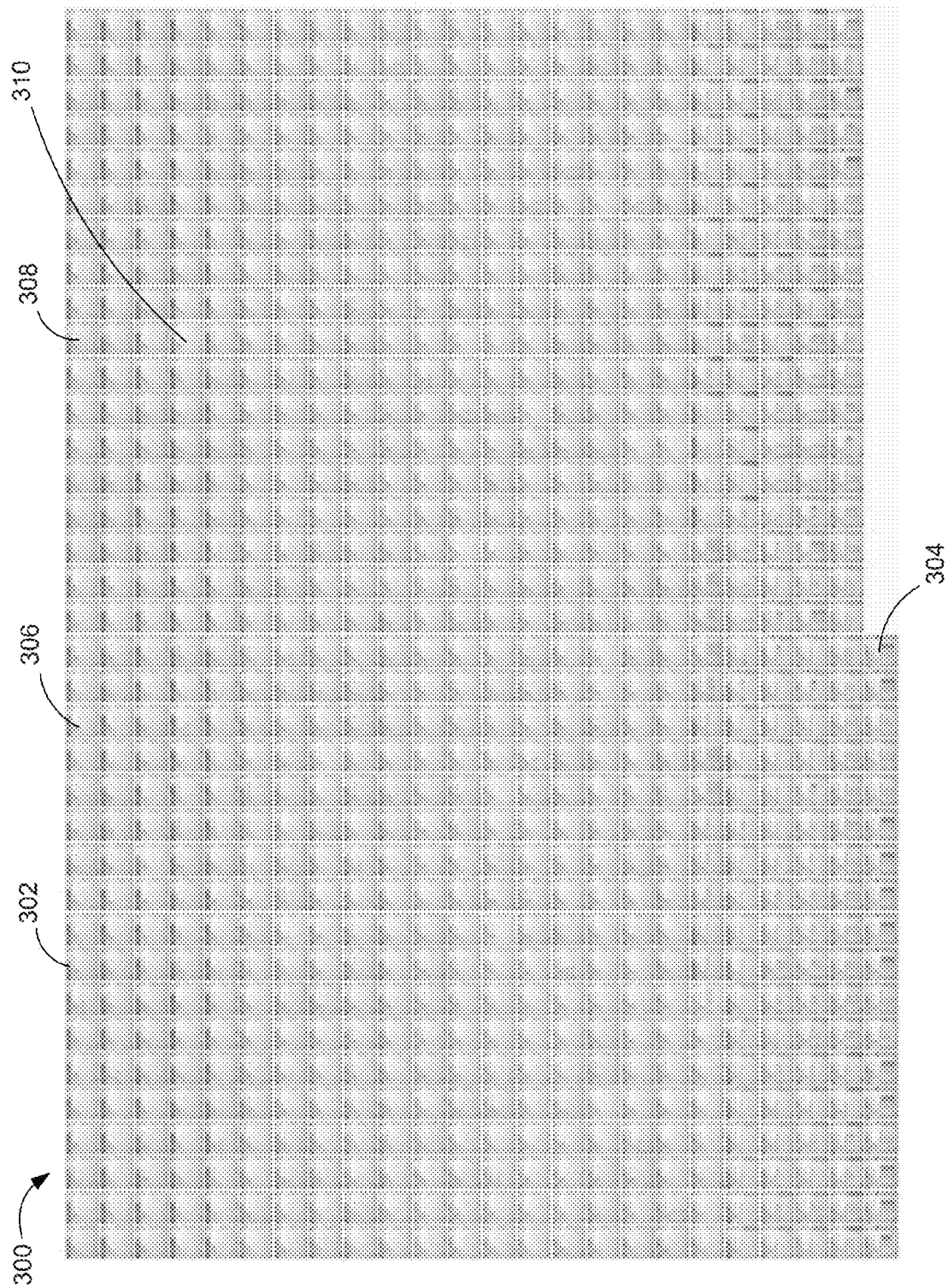
FIG. 3 is a screen capture image depicting a collection of healthcare claims in accordance with an embodiment.
Figure 4:
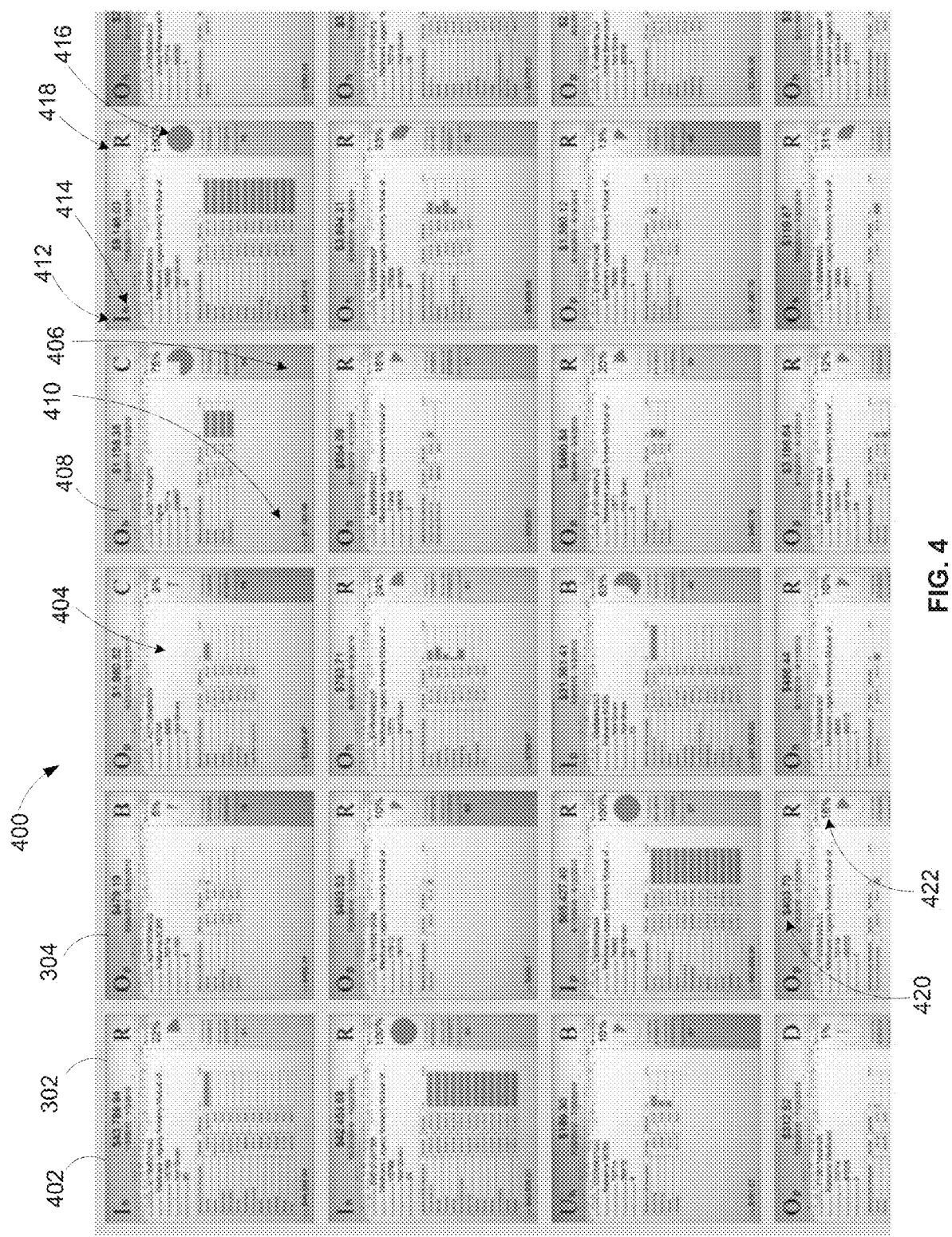
FIG. 4 is a screen capture image depicting a magnified view of a group of the collection of healthcare claims depicted in FIG. 3.
Figure 5:
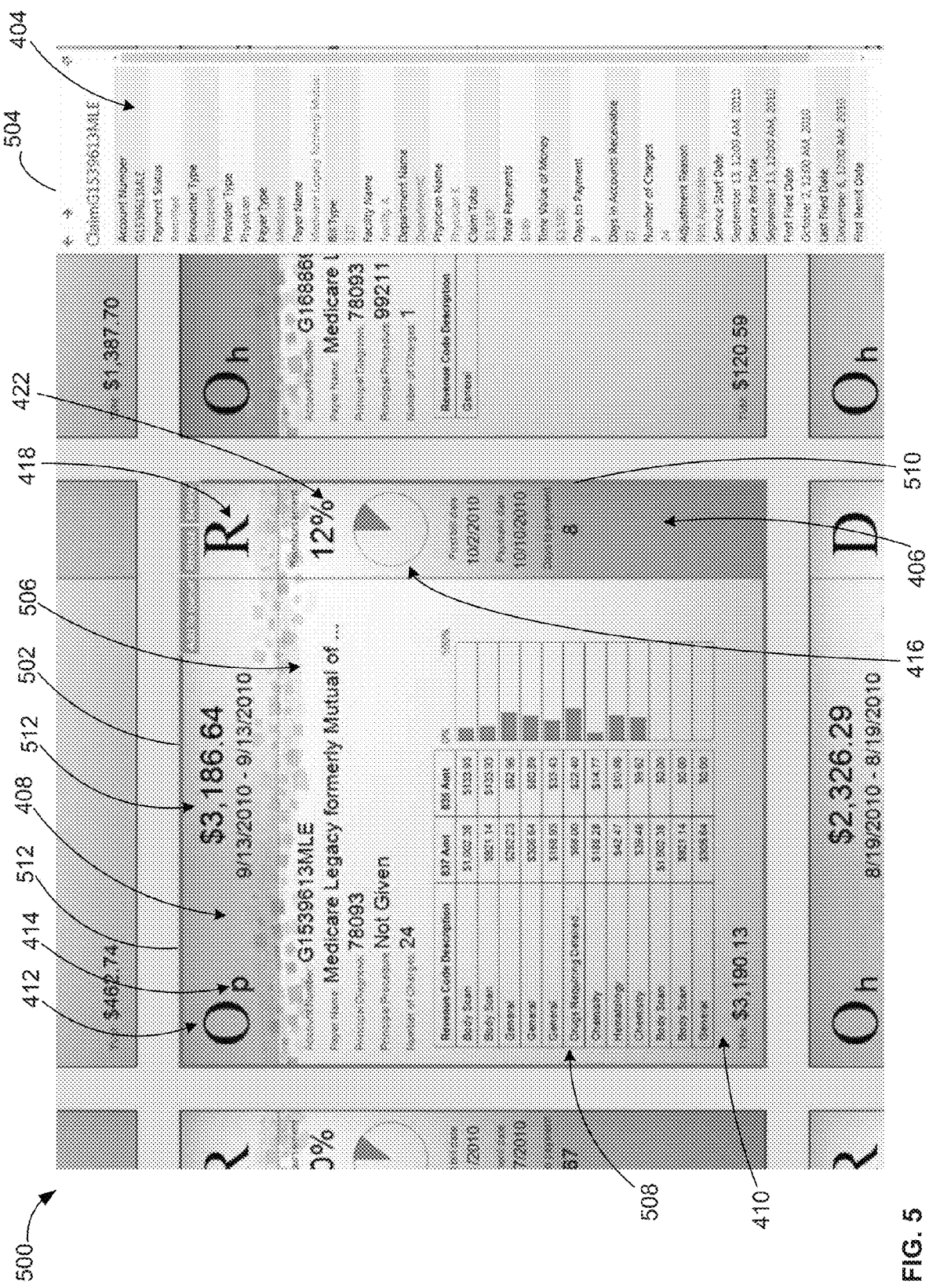
FIG. 5 is a screen capture image depicting a further magnified view of the group of healthcare claims depicted in FIG. 4.

Referring now to FIGS. 3-5, shown are exemplary screen shot images representing a collection 300 of healthcare claims, at three different zoom levels, that may be generated by the healthcare claims visual analysis tool 204 and displayed, for example, on the display 114 of the user computer 102 via the web browsing software application 120. The healthcare claims visual analysis tool 204 visually codifies informational aspects of each healthcare claim so that a quick scan (or view) of one, or all, of the healthcare claims conveys meaningful information about at least one aspect of the viewed claim(s). Moreover, the healthcare claims visual analysis tool 204 may be configured to interactively display the collection 300 so that moving from one zoom level to the next increases (or decreases) the scope and/or preciseness of the claim aspect information being conveyed. The user may customize the amount of claim aspect information being displayed for the collection 300, by, for example, zooming in on the collection 300 if more detail is needed, or zooming out from the collection 300 if less detailed is needed. In one embodiment, the collection 300 may also be sorted according to one or more claim aspects, allowing the user to further customize his/her viewing experience (to be discussed in more detail below with respect to FIG. 8).

In some embodiments, the type and/or amount of content (e.g., data fields 404) that is discernibly displayed at a given time may vary depending on the current zoom level and/or, if applicable, the criteria used to sort the collection 300. For example, when the collection 300 is being viewed from a furthest level of zoom, as shown in FIG. 3, only the content that is considered most pertinent may be discernible. In some embodiments, as the user zooms in on the collection 300 from the furthest zoom level, increasing amounts of visually codified content may become intelligible or otherwise discernible. In other embodiments, the healthcare claims visual analysis tool 204 may increase the amount of content that is being visually codified as the user zooms in on the collection 300 from the furthest zoom level, and may decrease the amount of content that is being visually codified as the user zooms out. In one embodiment, the healthcare claims visual analysis tool 204 may be configured to determine which content should be visible at each level of zoom. As another example, the type of content that is being visually represented by the collection 300 may vary depending on whether the collection 300 has been sorted or arranged according to a claim aspect category. For example, if the user decides to sort the collection 300 so that only denied claims are in view, the collection 300 may display denial-specific information (e.g., reason code for denial, date of denial, date of service, etc.). And if the user decides to sort the collection 300 so that only remitted claims are in view, the collection 300 may display remittance-specific information (e.g., amount paid, date of payment, date of service, etc.). Thus, according to some embodiments, the healthcare claims visual analysis tool 204 may be configured to change, adjust, or otherwise alter the healthcare claim information being presented and/or visually codified within the collection 300 at a given moment based on user manipulation (e.g., selecting, categorizing, sorting, zooming in/out, etc.) of correspondingly displayed images.

To illustrate, FIG. 3 is a zoomed out view of the entire collection 300, which includes a colorful array of squares 302. According to the illustrated embodiment, each square 302 represents a healthcare claim. Each of the colors shown in FIG. 3 may intuitively indicate a specific value associated with an informational aspect of a given healthcare claim. For example, the color green may indicate a healthcare claim 304 that has been remitted, the color blue may indicate a healthcare claim 306 that is unremitted, the color red may indicate a healthcare claim 308 that has been denied, and the color yellow may indicate a healthcare claim 310 that has been adjusted. Thus, with just a quick glance at FIG. 3, one can discern, for example, that a majority of the healthcare claims in the collection 300 are unremitted.

Figures 6, 7:
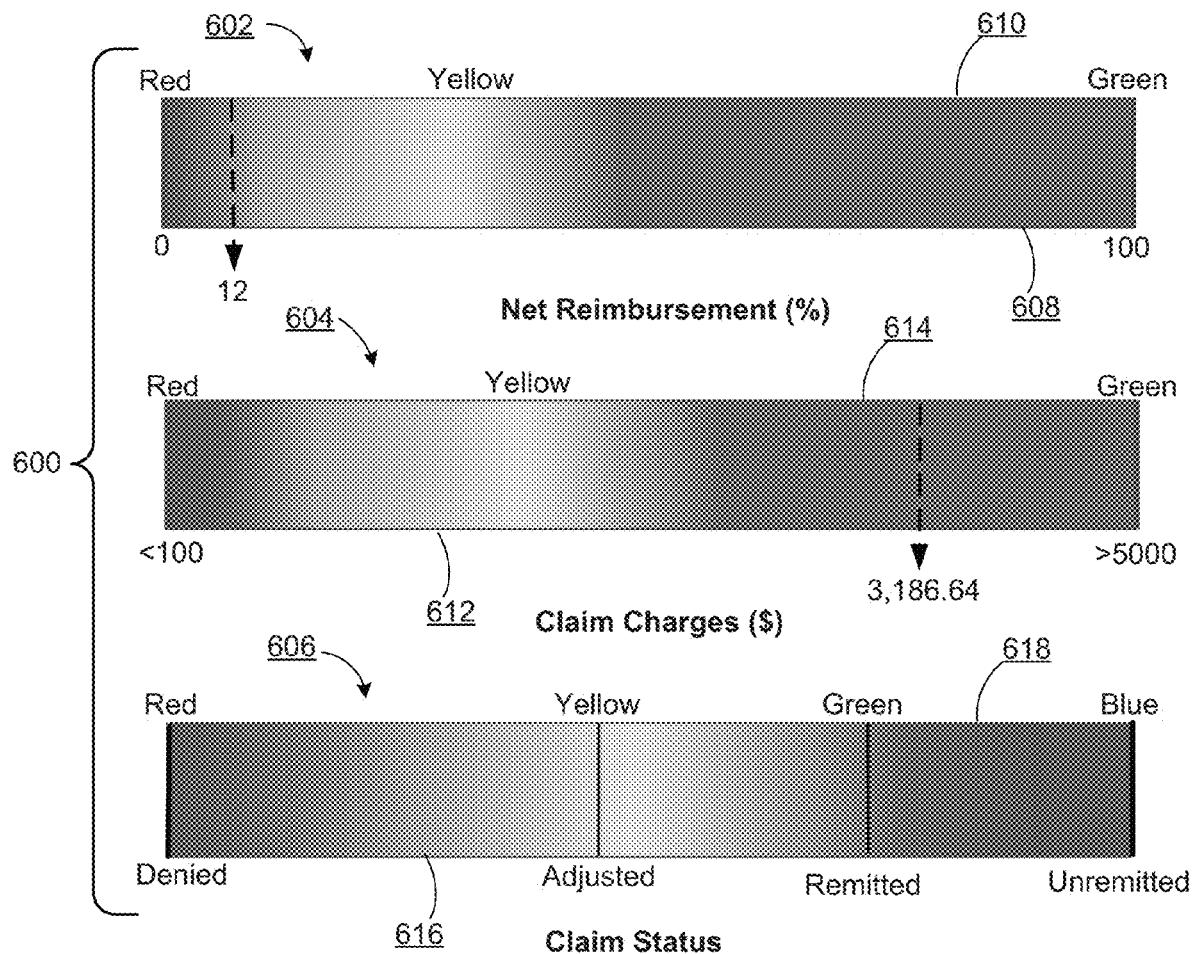
FIG. 6 is a block diagram illustrating a healthcare claim color code in accordance with an embodiment.
FIG. 7 is a chart for assigning symbols to represent select healthcare claim information in accordance with one embodiment.

FIG. 4 is a partially zoomed-in (or magnified) view of an area within the collection 300 that consists primarily of remitted claims 304, delineating a group 400. Moving from FIG. 3 to FIG. 4 reveals that the colorful squares 302 are actually healthcare claim graphics 402 that contain numerous data fields 404. The data fields 404 may correspond to the claim aspect categories used to categorize information for each healthcare claim. At the zoom level shown in FIG. 4, only a portion of the data fields 404 in each healthcare claim graphic 402 is clearly discernable, for example, a first group of data fields that is displayed with color coding and a second group of data fields that includes various symbols. According to one embodiment, the first group of data fields includes a net reimbursement data field 406, a claim charges data field 408, and a claim status data field 410. Each data field in the first group of data fields may be assigned a color according to a healthcare claim color code 600, as depicted in FIG. 6. The healthcare claim color code 600 assigns a specific color to each data field within the first group of data fields based on a linear relationship between a color scale 602 and a value scale 604 (to be discussed in more detail below with reference to FIG. 6). The illustrated embodiment also provides that the second group of data fields includes a patient type data field 412, a provider type data field 414, a net reimbursement data field 416, and a payer type data field 418. Each data field in the second group of data fields may be assigned a symbol based on a healthcare claim symbol chart 700 (to be discussed in more detail below with reference to FIG. 7). A third group of data fields with prominent numerical values may be at least partially discernable from the zoom level depicted in FIG. 4. The third group of data fields may include, for example, a claim charges data field 420 and a net reimbursement data field 422. As will be appreciated, one or more data fields 404 may include the same claim aspect information, but each data field 404 may present the included information using a different visual effect.

FIG. 5 is a further zoomed-in view of the remitted claim group 400 so as to show a magnified view 500 of a selected healthcare claim graphic 502 and an associated claim information panel 504. For example, while viewing the remitted claim group 400, the user may prompt magnified view 500 by selecting (e.g., double-clicking, right-clicking, etc.) the healthcare claim graphic 502 for more detailed viewing and claim analysis. In the illustrated embodiment, a main body 506 of the selected healthcare claim graphic 502 includes data fields 404 for account number, payer name, principal diagnosis, principal procedure, number of charges, time value of money (TVM), and an itemized revenue chart 508 that lists each claim charge, the amount billed in the EDI message 837, the amount remitted according to the EDI message 835, and a net reimbursement for each charge. The main body 506 also includes the claim status data field 410, discussed with reference to FIG. 4, which represents the claim status information with a color assigned by the healthcare claim color code 600. For example, in the illustrated embodiment, the main body 506 is colored green because the claim status of the healthcare claim graphic 502 is "remitted."

A side bar 510 of the healthcare claim graphic 502 includes data fields 404 for first bill date, payment date, and days to payment. The side bar 510 also includes the net reimbursement data field 422, the net reimbursement data field 416, and the net reimbursement data field 406, with each data field representing the net reimbursement information with varying levels of preciseness. For example, in the illustrated embodiment, the data field 422 includes a numerical percentage of the net reimbursement received, the data field 416 includes a pie chart symbol that graphically displays the net reimbursement (e.g., amount of claim payments received as compared to the total amount of claim charges), and the data field 406 includes a color that graphically symbolizes the net reimbursement amount. By presenting the information in three different formats with three levels of preciseness, the net reimbursement information for each healthcare claim can be at least generally conveyed at each zoom level (e.g., collection 300, remitted claim group 400, or magnified view 500).

A top bar 512 of the healthcare claim graphic 502 includes data fields 404 for the healthcare claim's service start date and service end date. The top bar 512 also includes the claim charges data field 408, the patient type data field 412, the provider type data field 414, the claim charges data field 420, and the payer type data field 418. The claim charges data field 408 includes a color that graphically symbolizes the amount of claim charges for the associated healthcare claim, while the claim charges data field 420 includes a numerical dollar value of the total claim charges accrued in the associated healthcare claim. Thus, like the side bar 510, the top bar 512 presents information with varying levels of preciseness so that the included information can be at least generally conveyed at each zoom level.

When an individual healthcare claim graphic 502 is selected for detailed viewing, the magnified view 500 provides further information about the associated healthcare claim through claim information panel 504. The claim information panel 504 may display information included in one or more of the data fields 404 as the healthcare claim graphic 502. Additionally, the claim information panel 504 may display information according to claim aspect categories that are not included in data fields 404. For example, in the illustrated embodiment, the claim information panel 504 includes the additional claim aspect categories of bill type, facility name, department name, physician name, adjustment reason, etc. According to one embodiment, while viewing claims in the magnified view 500, the user may move between individual healthcare claim graphics 502 by, for example, moving a navigation button left or right, and the claim information panel 504 may automatically update to reflect the information corresponding to the currently selected healthcare claim graphic 502. In one embodiment, as the user moves between individual healthcare claim graphics 502, the claim information panel 504 may remain "docked" or fixed to one side the computer screen 114 being used in connection with the healthcare claims visual analysis tool 204. As will be appreciated, at times, the level of detail provided by the claim information panel 504 may be more than what is needed for the claim analysis being performed by the user. In one embodiment, the claim information panel 504 may be optionally closed when not needed and reopened again when the need arises.

In some embodiments, the healthcare claim information available to the healthcare claims visual analysis tool 204 may be arranged in a hierarchy with several levels of data (e.g., claim level, payer level, provider level, encounter level, patient level, etc.). The healthcare claims visual analysis tool 204 may be configured to alter the content of the collection 300 based on the hierarchical level of the information being displayed. For example, the content being displayed in each square 302 of the collection 300 may depend on the applicable data level, at least because each hierarchical level of data may be associated with a predefined set of data fields 404 based on the claim aspect categories that correspond to the information included therein. While FIGS. 3-5 show the collection 300 as representing claim level data, with each square 302 visually codifying a summary of an invoice to a payer, the principles disclosed herein are not limited to displaying claim level data in the illustrated manner and may be applied to representing any other hierarchical level of data. For example, the healthcare claims visual analysis tool 204 may arrange and/or visually represent healthcare claim data at a claim filing level (e.g., each square 302 representing a field from a single invoice), a remittance level (e.g., each square 302 representing a received payment), a patient encounter level (e.g., each square 302 representing a claim associated with a single patient encounter), a patient summary level (e.g., each square 302 representing an encounter with a given patient), or any other level within the data hierarchy. In one embodiment, a combination of two or more data levels may be visually represented by the healthcare claims visual analysis tool 204.

Referring now to FIG. 6, the healthcare claim color code 600 may assign a color to, for example, each data field 406, 408, and 410 in the first group of data fields based on a relationship between a color scale and a value scale associated with the information included in each data field. For example, the color scale may be a linear color gradient where the color starts at a first color and gradually progresses towards a second color at the end of the scale. Thus, the color scale may include a plurality of intermediate colors between the first color and the second color. The color progression within the linear color gradient is usually smooth, but can be configured to be more finely defined so that the intermediate color transitions are sharper.

According to the illustrated embodiment, the healthcare claim color code 600 may include three information-specific color codes, each assigning colors according to its own relationship between a color scale and a value scale. A net reimbursement code 602 may be configured to assign a color from a color scale 610 to each net reimbursement value on a value scale 608 ranging from 0% to 100%. The color scale 610 starts at the color red and gradually progresses towards the color green, with intermediate colors including orange and yellow. For example, using the net reimbursement code 602, it can be determined that a net reimbursement value of 12% corresponds to an orange-red color. Accordingly, in FIG. 5, the net reimbursement data field 406 of the healthcare claim graphic 502 is filled with this orange-red color to represent the corresponding 12% value.

Similarly, a claim charges code 604 may be configured to assign a color from a color scale 614 to each claim charges value on a value scale 612 ranging from less than $100 to more than $5,000. The color scale 614 starts at the color red and gradually progresses towards the color green, with intermediate colors including orange and yellow. For example, using the claim charges color code 602, it can be determined that a claim charges value of $3,186,64 corresponds to a lime-green color. Accordingly, in FIG. 5, the claims charges data field 408 of the healthcare claim graphic 502 is filled with this lime-green color to represent the corresponding $3,186,64 value.

Further, a payment status code 606 may be configured to assign a color from a color scale 618 to each payment status value on a value scale 616 that includes the fixed values "denied," "adjusted," "remitted," and "unremitted." The color scale 618 starts at the color red and gradually progresses towards the color blue, with intermediate colors including yellow and green. The color scale 618 may be configured to sharply define the colors red, yellow, green, and blue in order to clearly correspond to the four fixed values in the value scale 616. For example, using the payment status color code 606, it can be determined that a remitted status value corresponds to the color green. Accordingly, in FIG. 5, the claim status data field 410 is filled with the green color to represent the corresponding remitted status value.

The colors assigned by the healthcare claim color code 600 may be intuitive indicators of at least one value associated with the healthcare claim information. For example, in the illustrated embodiment of FIG. 6, the color green, which, for example, may be intuitively linked to the color of money and/or a favorable situation, is used to represent the remittance of claims, especially high reimbursement amounts, and/or a large amount of claim charges. Also in FIG. 6, the color red, which, for example, may be intuitively linked to negative finances and/or an adverse situation, is used to represent the denial of claims, small reimbursement amounts, and/or a small amount of claim charges. Along the same line, in FIG. 6, the color yellow, which, for example, may be intuitively linked to a more neutral position, is used to represent the adjustment of claims, average reimbursements amounts, and/or an average amount of claim charges. And the color blue, which, for example, may be intuitively linked to a cool or calm situation, is used to represent unremitted claims.

As will be appreciated, the color scales 610, 614, and 618 may be configured to include any of a number of colors, other than those illustrated in the figures, so long as the colors impart specific meaning about the values with which they are associated in accordance with the teachings described herein. Furthermore, the progression of color within each of the color scales 610, 614, and 618 can be configured so that a specific intermediary color (i.e. a color between the starting color and the ending color) coordinates with a specific intermediary value (i.e. a value between the starting value and ending value) on the corresponding value scale. For example, instead of aligning the color yellow with the adjusted status value, the color code 606 could be configured so that the color orange represents adjusted healthcare claims. The present invention is not limited to the exact combination and/or configuration of colors and values described herein.

Referring now to FIG. 7, based on the healthcare claim symbol chart 700, the healthcare claims visual analysis tool 204 may assign an intuitive symbol or icon to each data field 412, 414, 416, and 418 in the second group of data fields based on a value associated with the claim aspect information included in the data field. Like the colors assigned to the first group of data fields, each of the symbols assigned to the second group of data fields is selected to convey valuable information about the associated healthcare claim, even when viewed from a distance as illustrated in FIG. 4. For example, depending on whether the claim aspect category of patient type includes an "inpatient" value or an "outpatient" value, the patient type data field 412 may include either an "I" symbol or an "O" symbol, respectively. And depending on whether the claim aspect category of provider type includes a "professional" value or a "hospital" value, the provider type data field 414 may include either a subscript "$_p$" symbol or a subscript "$_h$" symbol, respectively, with the subscript symbol being placed next to the patient type symbol. Similarly, depending on whether the claim aspect category of payer type includes a "Medicare" value, a "Medicaid" value, a "Commercial" value, or a "Blue Cross" value, the payer type data field 418 may include an "R" symbol, a "D" symbol, a "C" symbol, or a "B" symbol, respectively. For the net reimbursement data field 416, the healthcare claims visual analysis tool 204 generates a pie chart symbol using the net reimbursement value included in the claim aspect category of "net reimbursement." For example, in the net reimbursement data field 416 of healthcare claim graphic 502, the depicted pie chart symbol corresponds to the 12% net reimbursement value for that healthcare claim. Though specific examples of symbols are provided herein and shown in the figures, the present invention is not limited to these specific symbols. Any combination of symbols, letters, icons, pictures, or other graphics that is easily discernible as representing a certain claim aspect value may be used in accordance with the teachings described herein.

In some embodiments, instead of assigning a color to each data field within the first group of data fields based on the value associated with the data field, the healthcare claims visual analysis tool 204 may assign a symbol (e.g., icon, image, letter, number, and/or other graphic) to each of the data fields. According to these embodiments, a zoomed out view of the entire collection 300 would reveal an array of symbols, rather than the colorful array shown in FIG. 3. In one embodiment, the symbols may be similar to the symbols included in the healthcare claim symbol chart 700. In another embodiment, the symbols may be completely different than what is illustrated in FIG. 7. In other embodiments, a combination of colors and symbols may be used to represent each data field within the first group of data fields based on the value associated with the data field. Similarly, in some embodiments, instead of a symbol, a color may be assigned to each data field in the second group of data fields based on the value associated with the data field. In one embodiment, a color code similar to the healthcare claim color code 600 may be used to assign a color to each data field in the second group of data fields. In another embodiment, a completely different color code may be used. For example, the color code may include a set of colors that is different from the colors included in the color code 600 shown in FIG. 6. In other embodiments, a combination of colors and symbols may be used to represent each data field within the second group of data fields based on the value associated with the data field. By combining colors and symbols, whether to represent the first group of data fields, the second group of data fields, or any other data field, the healthcare claims visual analysis tool 204 may be able to provide a more accurate and/or more detailed visual representation of each data field at each zoom level.

Figure 8:
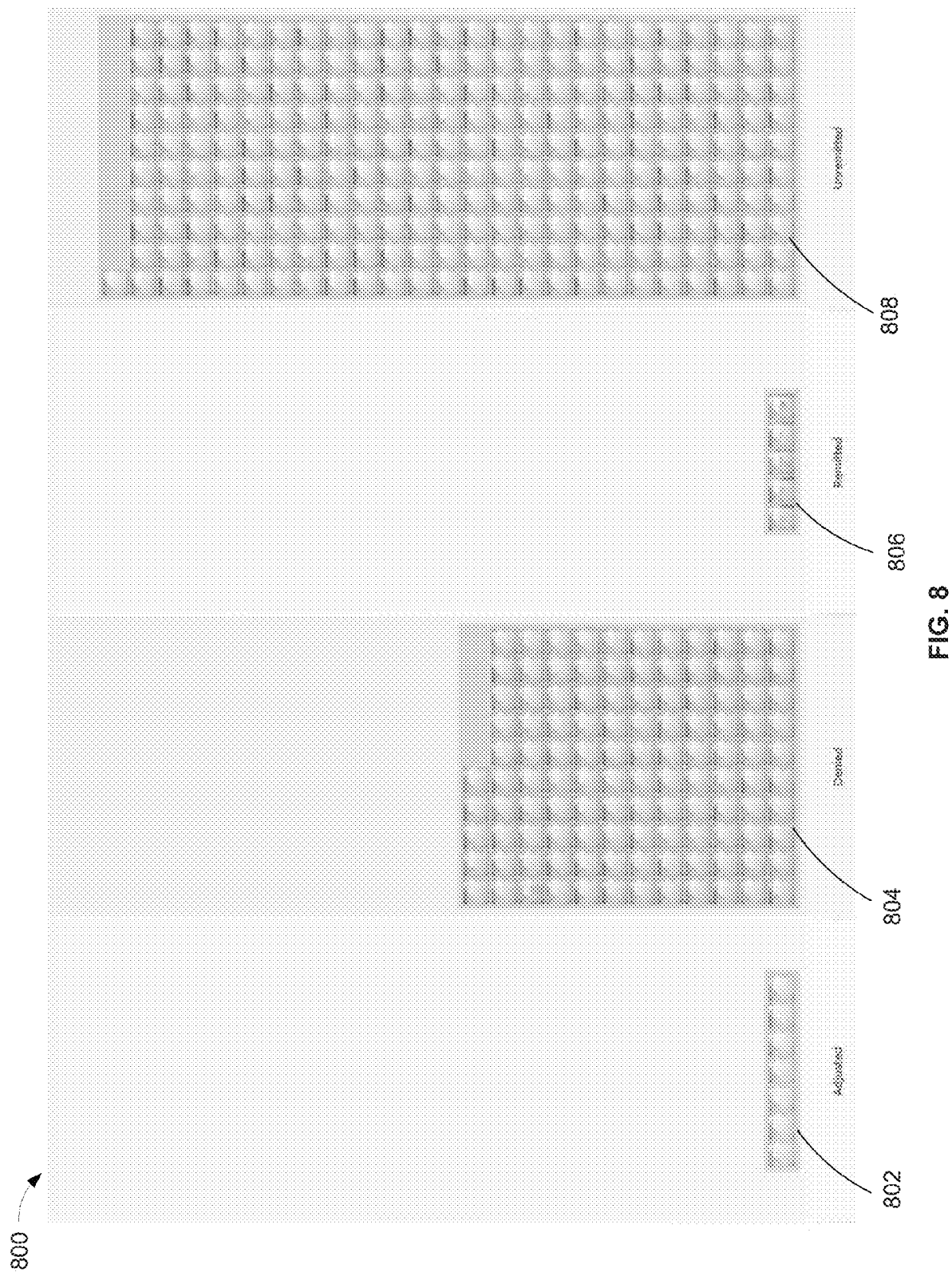
FIG. 8 is a screen capture image depicting the collection of healthcare claims of FIG. 3 in a sorted arrangement according to one embodiment.

Referring now to FIG. 8, the healthcare claims visual analysis tool 204 may be configured to allow the healthcare claims in the collection 300 to be sorted or filtered according to one or more data fields 404, in order to facilitate further analysis of the included healthcare claims. In the illustrated embodiment, the claims have been sorted according to claim status and are presented in a block chart 800 with a column 802 of adjusted claims, a column 804 of denied claims, a column 806 of remitted claims, and a column 808 of unremitted claims. Though the collection 300 in FIG. 3 provides a color-based synopsis of the collective claim statuses of associated healthcare claims, the block chart 800 allows for a more structured analysis of the claims based on claim status. Moreover, the block chart 800 may be used to hone in on a narrower selection of healthcare claims by, for example, further sorting one or more selected columns based on one or more data fields 404. For example, the healthcare claims visual analysis tool 204 could display a block chart (not shown) including all unremitted claims grouped by payer name.

Figure 9:
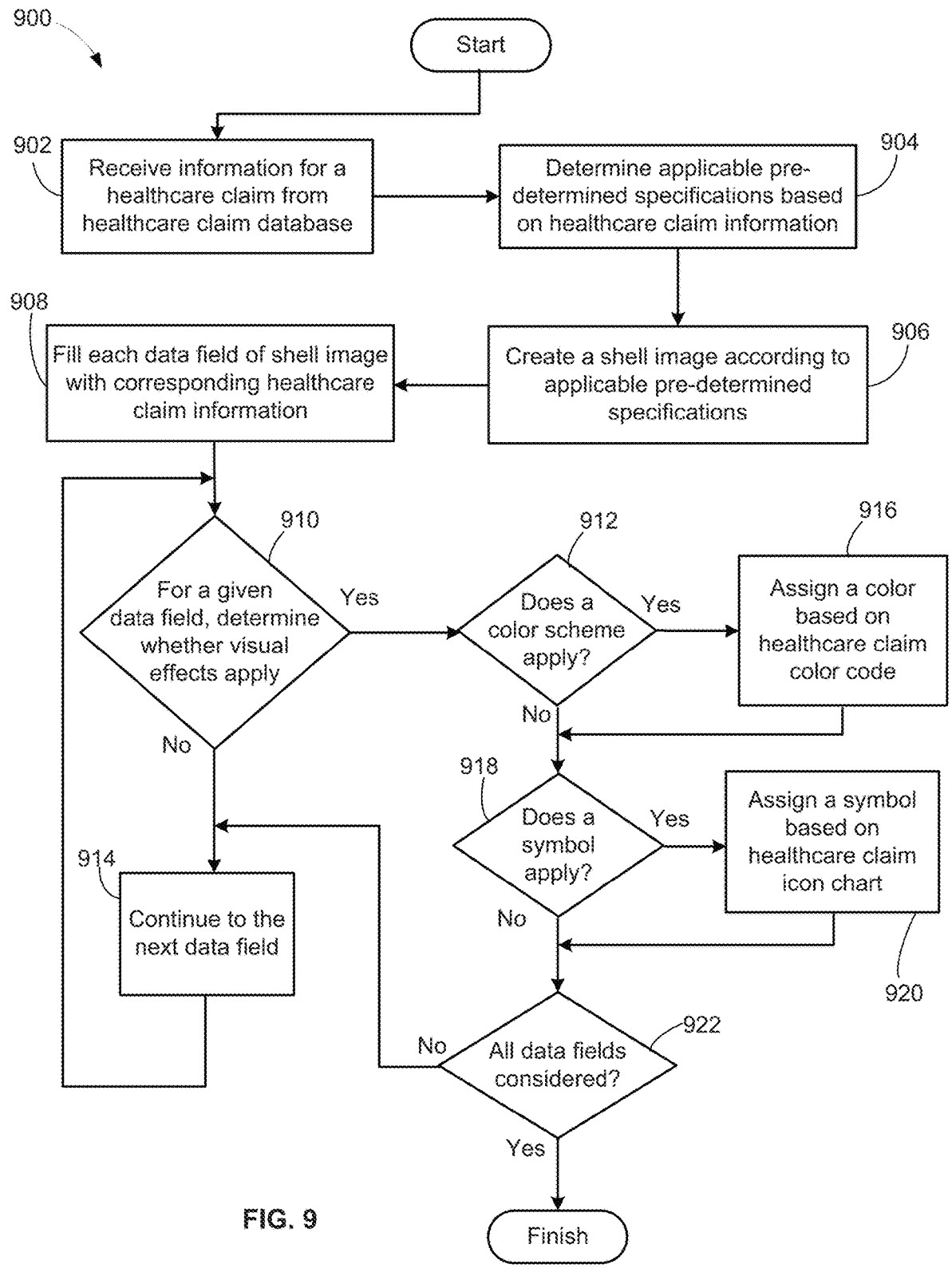
FIG. 9 is a flow diagram illustrating an embodiment of a method for visually codifying information associated with a plurality of healthcare claims.

Referring now to FIG. 9, shown is a method 900 for visually codifying information associated with a plurality of healthcare claims. One or more of the method steps may be carried out by the healthcare claims visual analysis tool 204. The method 900, which may be implemented using software and/or hardware, begins at step 902, where information for a particular healthcare claim is received from the healthcare claims database 108. For example, specific healthcare claim information may be retrieved from the database 108 in response to a request from the user computer 102. Alternatively, healthcare claim information may be automatically received as the information is added to the healthcare claims database 108, for pre-processing the information in anticipation of a user request to display, for example, the healthcare claims collection 300.

In either case, at step 904, for each piece of healthcare claim information received, a determination is made as to which set of pre-determined specifications should be applied based on one or more of the claim aspect categories associated with the received information. In one embodiment, the applicable set of pre-determined specifications is selected based on the claim status of each healthcare claim. For example, a different set of pre-determined specifications may exist for each claim status category, namely remitted, unremitted, denied, and adjusted. The pre-determined specifications may determine the selection of data fields 404 to be displayed in each healthcare claim graphic 502 and/or the arrangement of selected data fields 404 within each healthcare claim graphic 502. As an example, for remitted claims, the applicable pre-determined specifications may require that the claim charges chart 508 be included in the main body 506 and that the claim aspect "days to payment" be included in the side bar 510. For adjusted claims, the applicable pre-determined specifications may require, for example, that a claim adjustments chart, listing each claim charge and the reason for adjustment, be included in the main body 506. Similarly, for denied claims, the applicable pre-determined specifications may require, for example, that a claim denial chart, listing each claim charge and the reason for denial, be included in the main body 506.

At step 906, a shell image is created by arranging the data fields 404 selected in step 904 as required by the pre-determined specifications. At step 908, the data fields 404 in the shell image are populated or filled with corresponding healthcare claim information. At step 910, beginning with a first data field 404, a determination is made as to whether visual effects apply. In one embodiment, visual effects apply if the data field 404 belongs to either the first group of data fields or the second group of data fields, as discussed above with respect to FIGS. 6 and 7. The visual effects may include color coding of the data fields and/or use of an icon, symbol, or other graphic. If the determination at step 910 is yes, e.g., the data field belongs to the first group of data fields, then the method 900 moves to step 912. If the determination at step 910 is no, e.g., the data field does not belong to either the first group of data fields or the second group of data fields, then the method 900 moves to step 914. At step 914, the method moves to the next data field 404 and repeats the determination made at step 910 for this next data field 404.

At step 912, a determination is made as to whether a color scheme applies to the data field 404. A color scheme may apply, for example, if the data field 404 belongs to the first group of data fields. If the determination at step 912 is yes, then the method 900 moves to step 916. At step 916, a color is assigned to the data field 404 based on the value associated therewith and the healthcare claim color code 600. For example, if the data field 404 is the claim status data field 410 and the value associated with claim status data field 406 is "remitted," then the color assigned to the data field 410 will be green, according to the healthcare color code 600. After step 916, the method 900 moves on to step 918. If the determination at step 912 is no, e.g., the data field 404 does not belong to the first group of data fields, then the method 900 moves directly to step 918.

At step 918, a determination is made as to whether a symbol should be assigned to the data field 404. A symbol may be assigned if, for example, the data field 404 belongs to the second group of data fields. If the determination is yes, then the method 900 moves to step 920. At step 920, a symbol is assigned to the data field 404 based on the value associated therewith and the healthcare claims symbol chart 700. For example, if the data field 404 is the payer type data field 418 and the value associated with the payer type data field 418 is "Medicare," then the symbol assigned to the data field 418 will be "R." After step 920, the method 900 moves to step 922. If the determination at step 918 is no, e.g., the data field 404 does not belong to the second group of data fields, then the method 900 moves to step 922. At step 922, a determination is made as to whether all data fields 404 within the shell image have been considered for visual effects application. If the answer is no, the method 900 moves back to step 914 and continues to the next data field 404. If the answer is yes, e.g., all data fields 404 have been considered for visual effect application and all applicable visual effects have been assigned, then the healthcare claim graphic 502 is complete and the method 900 finishes.

Figure 10:
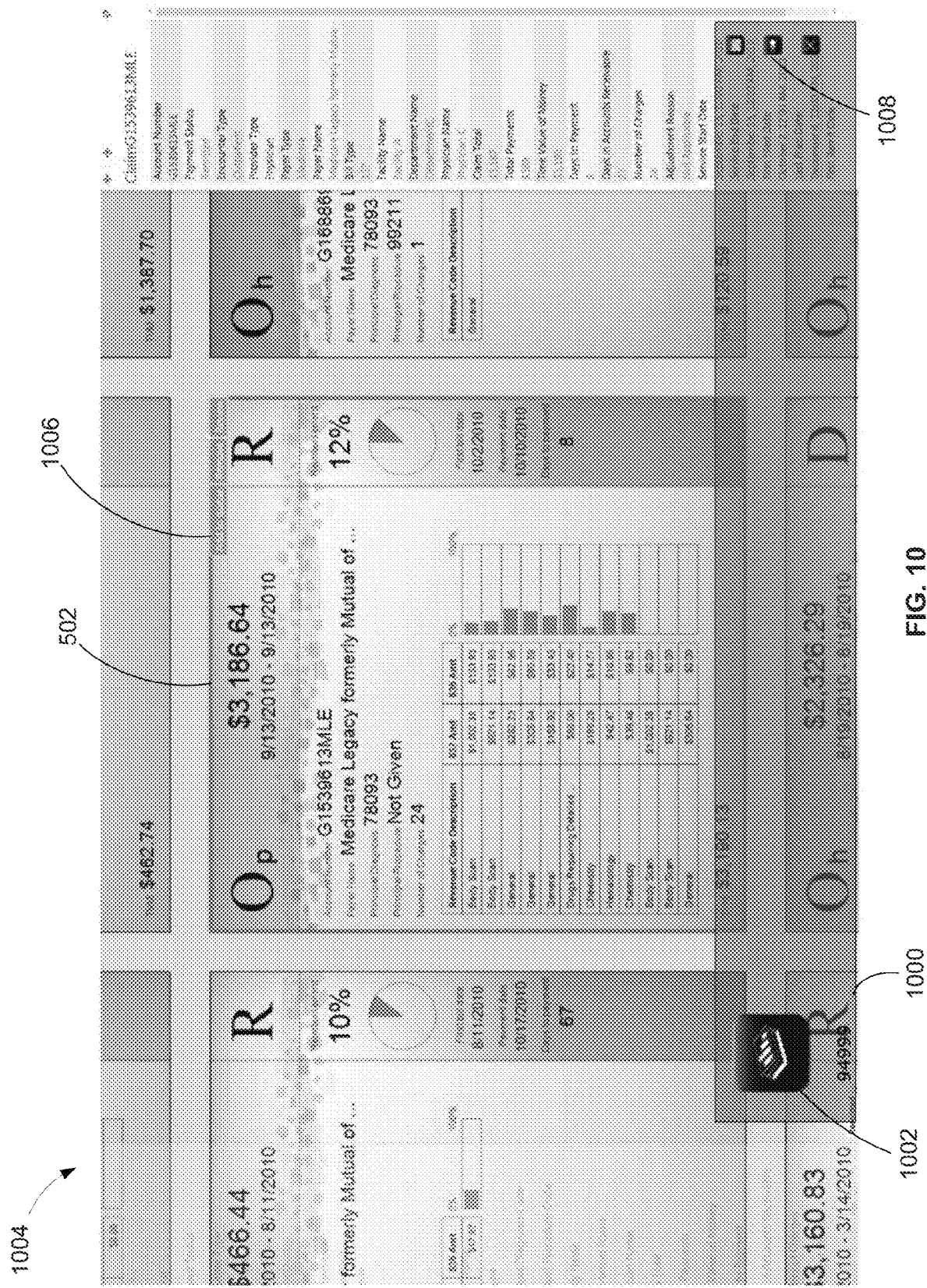
FIG. 10 is a screen capture image depicting a claim queue in accordance with one embodiment.

In one embodiment, the healthcare claims visual analysis tool 204 includes a queue window 1000 for holding user-selected healthcare claim graphics 1002 until the user is ready to move or export the information associated with the user-selected graphics 1002 to, for example, an external source. For example, in FIG. 10, a selected healthcare claim graphic 1002 is shown in queue window 1000. The selected graphic 1002 may represent a healthcare claim graphic 502 that have been graphically moved to the queue window 1000 from the main screen 1004. The healthcare claim visual analysis tool 204 may graphically move the healthcare claim graphic 502 upon user-selection of the healthcare claim graphic 502 (e.g., double-clicking on the graphic 502, dragging the graphic 502 into the queue window 1000, etc.) and/or upon user-selection of an "add to queue" button 1006 that may appear in the top right corner of the healthcare claim graphic 50. Though the queue window 1000 is shown as having only one graphic 1002, it will be appreciated that a plurality of graphics 1002 may be included in the queue window 1000. For example, while analyzing the healthcare claim collection 300, the user may locate and select several healthcare claims of interest based on certain criteria or needs of the user. The user may add each of these claims to the queue window by, for example, selecting the button 1006 on each associated healthcare claim graphic 502. Once the user is finished analyzing the collection 300, the user may select, for example, a send button 1008 within the queue window 1000 to send the information associated with the selected graphics 1002 to the external source for further processing, analyzing, etc. The external source may include a standard computer program application (e.g., a word processing application, a spreadsheet application, a database application, an email application, etc.), a specialized and/or industry-specific computer software application (e.g., an application specifically developed by or for The SSI Group, MedWorth, or other companies in the healthcare or financial industries), a storage device (e.g., an internal computer hard drive, a flash drive, an external hard drive, etc.).

According to one embodiment, one or more of the data fields 404 and/or the categories listed in the information panel 504 may be interactive links, e.g., hyperlinks, that, when selected, may direct the user to a new collection of healthcare claims, a web page pertaining to information related to the data field 404, or other related information source. For example, by selecting, e.g., double-clicking, a hyperlinked payer name data field 418 in a selected healthcare claim graphic 502, the collection 300 may be filtered to display only healthcare claims associated with the payer name value in the payer name data field 418. Alternatively, selecting a hyperlinked payer name data field 418 may prompt display of contact information for the payer listed in the payer name data field 418 and/or may direct the user to the payer's website.

As illustrated by FIGS. 3-5, 8 and 10, the healthcare claims visual analysis tool 204 uses a combination of visual effects and natural transitions to provide context to the healthcare claim information included in the collection 300 and to enable a user to quickly and efficiently narrow down, sort through, or otherwise view a massive collection of healthcare claims without feeling overwhelmed by the large quantity of information. As described herein, the healthcare claims visual analysis tool 204 provides healthcare claim graphics 502 with selected visual effects and specifically arranged data fields 404 that are discernable at varying levels of zoom. Thus, as a user selectably zooms in or out of the healthcare claims collection 300, the level of discernable detail for each claim automatically adjusts based on the selected level of zoom. Furthermore, the healthcare claims visual analysis tool 204 provides an option to sort the displayed claims according to one or more data fields 404. Once the desired level of sorting is achieved, the user may zoom in on one or more columns to selectably view additional details about the healthcare claims included therein. With the added queue function, the healthcare claims visual analysis tool 204 allows a user to not only analyze a massive amount of claim information in a visually interesting and manageable manner, but also save the user's work product and/or apply the results of the user's claim analysis to another application.

It should be emphasized that the above-described embodiments of the invention, particularly, any "preferred" or "particular" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

What is claimed is:

1. A system for dynamically presenting visually codified information associated with a plurality of healthcare claims submitted by healthcare service providers for payment of medical services and/or products provided to respective patients, the system comprising:

a database stored in a memory and configured to store claim information associated with the plurality of healthcare claims, the claim information being categorized into a plurality of categories including a claim status, provider type, patient type, payer type, net reimbursements, and claim charges, wherein the patient type category includes a value selected from a group comprising inpatient and outpatient; and a processor in communication with said database, the processor being configured to execute program code for:

receiving, from the database, the claim information associated with each of the plurality of healthcare claims;

determining a set of specifications for each healthcare claim based on the claim status of the healthcare claim;

creating a graphic for each healthcare claim according to the set of specifications and using the claim information associated with the healthcare claim, wherein each graphic includes a plurality of data fields for displaying the claim information associated with the healthcare claim for which the graphic is created, the plurality of data fields including a first group of data fields and a second group of data fields different from the first group of data fields, and wherein each data field contains a piece of the claim information belonging to a respective one of the plurality of categories;

for each graphic, assigning a color to each data field in the first group of data fields based on a value of the piece of claim information included in the data field;

for each graphic, assigning a symbol to each data field in the second group of data fields based on the piece of claim information included in the data field, wherein the symbol is configured to be displayed in the graphic in place of the piece of claim information;

providing, on a display, a plurality of user-selectable zoom options for dynamically toggling between a summary view of a collection of graphics, a group view of a user-selected group of graphics, and a detailed view of a user-selected graphic;

upon receiving user-selection of the zoom option for the summary view, automatically resizing the collection of graphics to fit within a display area of the display and for each graphic, displaying only the colors assigned to the first group of data fields;

upon receiving user-selection of the zoom option for the group view, automatically resizing the user-selected group of graphics to fit within the display area and for each graphic, displaying only the colors assigned to the first group of data fields and the symbols assigned to the second group of data fields; and upon receiving user-selection of the zoom option for the detailed view, automatically resizing the user-selected graphic to fit within the display area and displaying all of the plurality of data fields for the graphic, in addition to the colors assigned to the first group of data fields and the symbols assigned to the second group of data fields, wherein for each healthcare claim, the set of specifications determines a selection of the plurality of data fields to be displayed in each view and an arrangement of said plurality of data fields within the associated graphic.

2. The system of claim 1, wherein the colors are assigned based on a linear relationship between a color scale and a value scale for each data field, the color scale being a linear color gradient that gradually changes from a first color representing a starting value for a given data field to a second color representing an ending value for said data field, wherein the linear color gradient further includes a plurality of intermediate colors therebetween representing respective intermediate values between the starting and ending values.

3. The system of claim 1, wherein the first group of data fields includes net reimbursements, claim charges, and claim status.

4. The system of claim 1, wherein the second group of data fields includes payer type, patient type, provider type, and net reimbursements.

5. The system of claim 1, wherein the program code is further for providing a plurality of user-selectable display options including an option to sort the collection of graphics according to one or more user-selectable criteria.

6. The system of claim 5, wherein the program code is further for providing a plurality of user-selectable export options including an option to graphically move a user-selected graphic to a queue window, and an option to send the claim information associated with each graphic in the queue window to an external source.

7. The system of claim 1, further comprising a display configured to display each graphic with the plurality of user-selectable zoom options.

8. The system of claim 1, wherein the provider type is a value selected from a group comprising hospital and medical professional.

9. A method of dynamically presenting visually codified information associated with a plurality of healthcare claims submitted by healthcare service providers for payment of medical services and/or products provided to respective patients, the method comprising:

receiving, at a processor, claim information associated with each of the plurality of healthcare claims, the claim information being stored in a healthcare claim database and being categorized into a plurality of categories including a claim status, provider type, patient type, payer type, net reimbursements, and claim charges, wherein the patient type category includes a value selected from a group comprising inpatient and outpatient;

determining, using the processor, a set of specifications for each healthcare claim based on the claim status of the healthcare claim;

creating, using the processor, a graphic for each healthcare claim according to the set of specifications and using the claim information associated with the healthcare claim, wherein each graphic includes a plurality of data fields for displaying the claim information associated with the healthcare claim for which the graphic is created, the plurality of data fields including a first group of data fields and a second group of data fields different from the first group of data fields, and wherein each data field contains a piece of the claim information belonging to a respective one of the plurality of categories;

for each graphic, assigning, using the processor, a color to each data field in the first group of data fields based on a value of the piece of claim information included in the data field;

for each graphic, assigning, using the processor, a symbol to each data field in the second group of data fields based on the piece of claim information included in the data field, wherein the symbol is configured to be displayed in the graphic in place of the piece of claim information;

providing, on a display, a plurality of user-selectable zoom options for dynamically toggling between a summary view of a collection of graphics, a group view of a user-selected group of graphics, and a detailed view of a user-selected graphic;

upon receiving user-selection of the zoom option for the summary view, automatically resizing the collection of graphics to fit within a display area of the display, and for each graphic, displaying only the colors assigned to the first group of data fields;

upon receiving user-selection of the zoom option for the group view, automatically resizing the user-selected group of graphics to fit within the display area, and for each graphic, displaying only the colors assigned to the first group of data fields and the symbols assigned to the second group of data fields; and upon receiving user-selection of the zoom option for the detailed view, automatically resizing the user-selected graphic to fit within the display area, and displaying all of the plurality of data fields included in the graphic, in addition to the colors assigned to the first group of data fields and the symbols assigned to the second group of data fields, wherein for each healthcare claim, the set of specifications determines a selection of the plurality of data fields to be displayed in each view and an arrangement of said plurality of data fields within the associated graphic.

10. The method of claim 9, wherein the colors are assigned based on a linear relationship between a color scale and a value scale for each data field, the color scale being a linear color gradient that gradually changes from a first color representing a starting value for a given data field to a second color representing an ending value for said data field, wherein the linear color gradient further includes a plurality of intermediate colors therebetween representing respective intermediate values between the starting and ending values.

11. The method of claim 9, wherein the first group of data fields includes net reimbursements, claim charges, and claim status.

12. The method of claim 9, wherein the second group of data fields includes payer type, patient type, provider type, and net reimbursements.

13. The method of claim 9, further comprising:

displaying, on the display, a plurality of user-selectable display options including an option to sort the collection of graphics according to one or more user-selectable criteria.

14. The method of claim 9, further comprising:
graphically moving, using the processor, a user-selected graphic to a queue window; and
sending, using the processor, the claim information associated with each graphic in the queue window to an external source.

15. The method of claim 9, wherein the provider type is a value selected from a group comprising hospital and medical professional.

16. A non-transitory computer-readable medium having embodied thereon a healthcare claim visual analysis computer program executable by a processor to perform a method of dynamically presenting visually codified information associated with a plurality of healthcare claims submitted by healthcare service providers for payment of medical services and/or products provided to respective patients, the computer program comprising:
a first code segment for receiving claim information associated with each of the plurality of healthcare claims, the claim information being stored in a healthcare claim database and being categorized into a plurality of categories including a claim status, provider type, patient type, payer type, net reimbursements, and claim charges, wherein the patient type category includes a value selected from a group comprising inpatient and outpatient;
a second code segment for determining a set of specifications for each healthcare claim based on the claim status of the healthcare claim;
a third code segment for creating a graphic for each healthcare claim according to the set of specifications and using the claim information associated with the healthcare claim, wherein each graphic includes a plurality of data fields for displaying the claim information associated with the healthcare claim for which the graphic is created, the plurality of data fields including a first group of data fields and a second group of data fields different from the first group of data fields, and wherein each data field contains a piece of the claim information belonging to a respective one of the plurality of categories;
a fourth code segment for, for each graphic, assigning a color to each data field in the first group of data fields based on a value of the piece of claim information included in the data field;
a fifth code segment for, for each graphic, assigning a symbol to each data field in the second group of data fields based on the piece of claim information included in the data field, wherein the symbol is configured to be displayed in the graphic in place of the piece of claim information;
a sixth code segment for providing, on a display, a plurality of user-selectable zoom options for dynamically toggling between a summary view of a collection of graphics, a group view of a user-selected group of graphics, and a detailed view of a user-selected graphic;
a seventh code segment for, upon receiving user-selection of the zoom option for the summary view, automatically resizing the collection of graphics to fit within a display area of the display, and for each graphic, displaying only the colors assigned to the first group of data fields;
an eighth code segment for, upon receiving user-selection of the zoom option for the group view, automatically resizing the user-selected group of graphics to fit within the display area, and for each graphic, displaying only the colors assigned to the first group of data fields and the symbols assigned to the second group of data fields; and
a ninth code segment for, upon receiving user-selection of the zoom option for the detailed view, automatically resizing the user-selected graphic to fit within the display area, and displaying all of the plurality of data fields included in the graphic, in addition to the colors assigned to the first group of data fields and the symbols assigned to the second group of data fields,
wherein for each healthcare claim, the set of specifications determines a selection of the plurality of data fields to be displayed in each view and an arrangement of said plurality of data fields within the associated graphic.

17. The non-transitory computer-readable medium of claim 16, wherein the colors are assigned based on a linear relationship between a color scale and a value scale for each data field, the color scale being a linear color gradient that gradually changes from a first color representing a starting value for a given data field to a second color representing an ending value for said data field, wherein the linear color gradient further includes a plurality of intermediate colors therebetween representing respective intermediate values between the starting and ending values.

18. The non-transitory computer-readable medium of claim 16, wherein the first group of data fields includes net reimbursements, claim charges, and claim status, and the second group of data fields includes payer type, patient type, and provider type.

19. The non-transitory computer-readable medium of claim 16, wherein the provider type is a value selected from a group comprising hospital and medical professional.

* * * * *